United States Patent [19]
Funston et al.

[11] 3,909,888
[45] Oct. 7, 1975

[54] TURN-BUTTON FASTENER

[75] Inventors: Jules H. Funston; Elmer O. Grumet; Henry G. Mast; Charles J. Scott, all of Denver, Colo.

[73] Assignee: Samsonite Corporation, Denver, Colo.

[22] Filed: May 20, 1974

[21] Appl. No.: 471,479

[52] U.S. Cl......... 241/221 R; 292/DIG. 38; 292/204
[51] Int. Cl.².................... A44B 17/00; A44B 1/32
[58] Field of Search. 24/221 R, 212, 221 L, 73 RM, 24/109; 292/DIG. 38

[56] References Cited
UNITED STATES PATENTS

| | | |
|---|---|---|
| 855,575 | 6/1907 | Henerlau .............................. 24/98 |
| 1,303,770 | 5/1919 | Carr .................................. 24/221 R |
| 3,201,162 | 8/1965 | Paynor ............................... 24/221 R |
| 3,298,071 | 1/1967 | Flora ................................. 24/221 L |
| 3,344,488 | 10/1967 | Texier ............................... 24/221 R |
| 3,514,820 | 6/1970 | Rogg ................................. 24/221 R |
| 3,577,608 | 5/1971 | Teyler ............................... 24/221 R |

FOREIGN PATENTS OR APPLICATIONS

| | | |
|---|---|---|
| 1,481,580 | 4/1967 | France ............................... 24/221 R |
| 184,830 | 8/1963 | Sweden .............................. 24/221 R |

Primary Examiner—Bernard A. Gelak
Attorney, Agent, or Firm—George J. Netter

[57] ABSTRACT

A Turn-Button Fastener having part made of resilient plastic which provides positive indexing from the locked to the unlocked positions through interference of the parts.

1 Claim, 6 Drawing Figures

TURN-BUTTON FASTENER

The present invention relates to a turn-button fastener used to secure a flap in position, a divider flap in a suitcase, or flap covering the opening of a handbag, for example.

BACKGROUND OF THE INVENTION

Turn-button fasteners frequently include a base member, a rotatable knob, a spring to index and had the knob at various positions and a retaining ring to lock the base member to the knob. Where a flap is to be secured, there is usually provided a grommet which has an opening therein designed to fit over the base member. To secure the flap, the grommet is positioned over the knob and base member and is locked into position on the base member by rotating the knob such that its wider portions overlap the grommet.

SUMMARY AND OBJECTS OF THE INVENTION

The turn-button of this invention is manufactured from a resilient material and the parts have such relative dimensions that positive indexing between locked and unlocked positions is achieved by interference between parts with the material resiliency providing springlike cooperation of the parts.

An object of the present invention is to provide a fastener which is easily manufactured from few parts, simple to assemble, and has a high degree of reliability.

Further objects and advantages will appear more fully on examination of the turn-button fastener as illustrated in the accompanying drawing.

DESCRIPTION OF A PREFERRED EMBODIMENT

Figure 1:
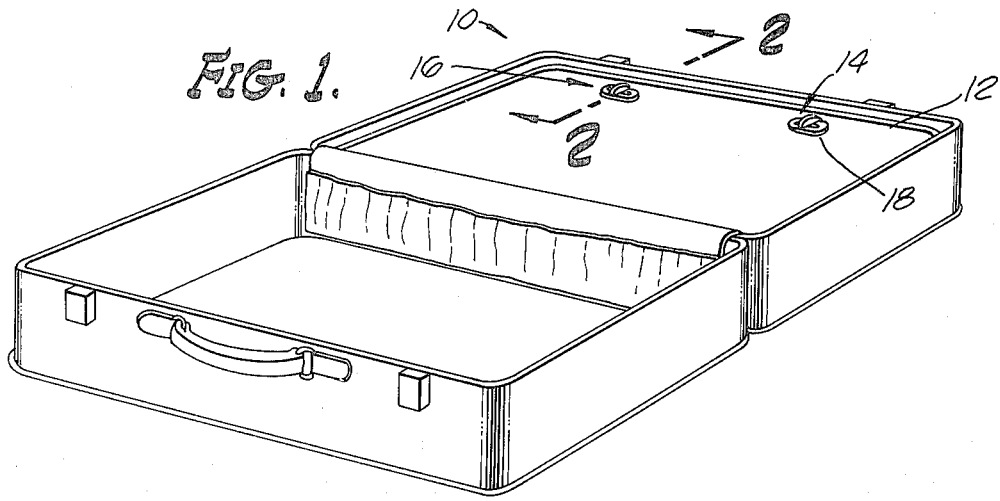
FIG. 1 is a perspective view of an open suitcase depicting the divider flap held in position by the turn-button fastener of this invention.

Referring to FIG. 1, an open luggage case 10 is illustrated with divider flap 12 secured by a pair of turn-button fasteners 14 and 16, made in accordance with this invention, with the fasteners shown in an overlapping or locked position. Briefly, as to operation, the turn-button includes an elongated rotatable part that in one orientation is receivable through a similarly dimensioned opening in a grommet 18 and when rotated 90° is lockingly retained within the grommet by interference between the rotatable part and the grommet.

Figure 6:
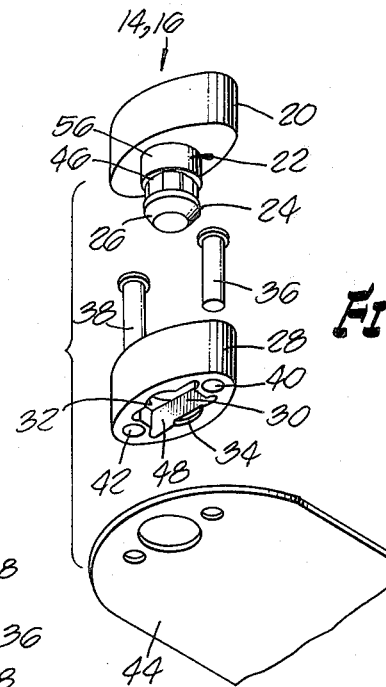
FIG. 6 is an exploded perspective view of the turn-button fastener, additionally showing rivets for its attachment to a support member and a fragmentary view of the support member.

Reference is now made to FIG. 6, showing the detailed construction of the turn-button fastener in exploded relation. An oblong knob 20 is constructed integrally with a cylindrical shaft 22, the latter having an enlarged collar 24 terminating in a beveled end 26. A base member 28 has an opening 30 which is so dimensioned as to permit receipt of shaft 22 therethrough in interfering relationship, the inherent resiliency of the material composing the base member providing sufficient distension to allow for passage of the shaft. On the far side of the base are arcuate recesses 32 and 34 for receiving the collar 24. Rivets 36 and 38 pass through base member openings 40 and 42 and secure it to a support member 44, which is affixed in the described embodiment to the luggage case wall.

Assembly of the described turn-button fastener parts together is an easy one-step operation and relies upon the aforementioned elastic property of plastic material composing the base member. To assemble, shaft 22 is forced through opening 30 from the side opposite the arcuate recesses 32 and 34. Beveled edge 26 assists in expanding the opening against the elastic forces of the base material so that the collar 24 can penetrate the opening. Finally, a zone of reduced cross-section 46 seats between two parallel flat surfaces 48 and 50 of the base member 24 when the collar is seated in the arcuate recesses 32 and 34. Once the collar is seated in the recesses, the shaft cannot be withdrawn from the base member due to obstructing wall surfaces behind the collar. The arcuate recesses also restrict lateral movement of the shaft within the base opening and maintain the shaft incontinuous axial alignment therein.

Figure 2:
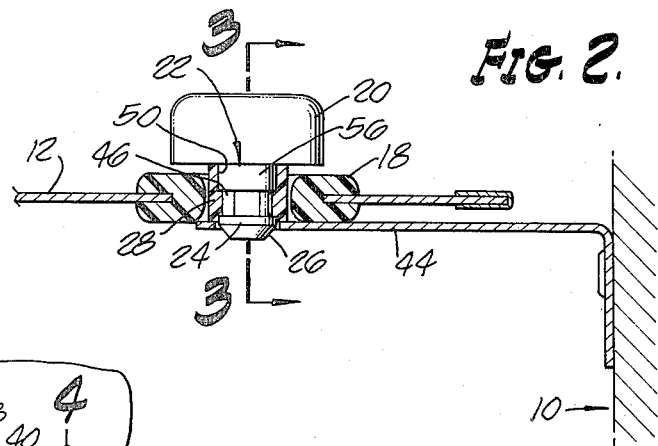
FIG. 2 is a frontal elevational view taken along the section line 2—2 in FIG. 1.
Figure 3:
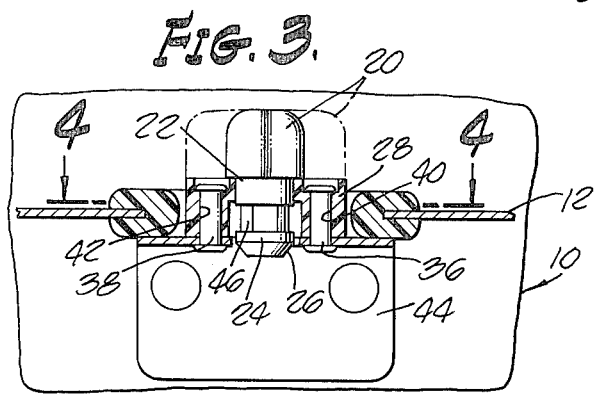
FIG. 3 is a fragmentary elevational view taken along the section line 3—3 in FIG. 2.

FIG. 2 shows grommet 18 secured to an opening in the flap 12 in a conventional manner. The oblong knob 20 is in the closed or overlapping position and holds the grommet 18 to the support member 44. Also, in FIG. 3 knob 20 is shown in its locked position, but as viewed at 90° to that in FIG. 2. Knob 20 is phantom lined in its open position in the latter figure, and it can be observed that grommet 18 at that point will clear the knob 20 to permit opening of flap 12.

Figure 4:
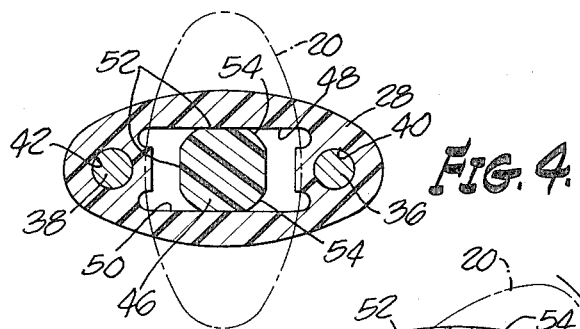
FIG. 4 is a plan sectional view of the turn-button fastener in an overlapping or locked position along the section line 4—4.

Turning now to FIG. 4, the reduced portion 46 of shaft 22 is substantially square in cross-section with four major flat sides 52 and the connecting corners chamfered as at 54. As shown, the base member 28 has the parallel flat surfaces 48 and 50 engaging two of the shaft major flat surfaces 52. This is the position that is achieved whenever the turn-button is in either the open or fully locked position.

The dimension of the reduced portion of the shaft 22 between opposing beveled or chamfered surfaces 54 is greater than the diameter of the shaft between major flat surfaces or sides 52. Accordingly, when knob 20 is rotated from, say, the locked or overlapping position to the open position, it passes through an intermediate unstable condition where two of the beveled corners 54 engage the flat surfaces 48 and 50. The resiliency of the plastic material used in the construction of base member 28 permits the side walls defining the opening 30 to distend, flexing outwardly as shown in FIG. 5 to accommodate the extra width of the shaft between the beveled corners.

In use, the flap 12 with a grommet 18 having an oblong opening therein is received on the turn-button fastener knob which is in the open position. The user then rotates the knob 20, 90° in either direction which causes first the beveled edges of the shaft to engage surfaces 48 and 50 on base member 28 and the yieldable side walls to flex as in FIG. 5. The shaft 22 is rotated through the unstable position to restore base member 28 to its unstressed condition with the major flat surfaces 52 on shaft 22 again parallel to flat surfaces 48 and 50 of the yieldable base member. The elasticity of the yieldable base member sides enables this indexing of the knob 20 and also provides sufficient rest force to retain knob 20 in any of its stable positions. Also, by the described action a positive setting of the turn-button is obtained which can be clearly felt by the user.

Figure 5:
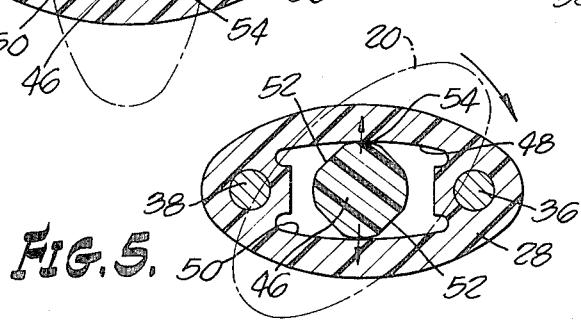
FIG. 5 is a plan sectional view of the turn-button fastener similar to FIG. 4 only shown in an intermediate unstable position.

As already noted, the base member opening 30 is defined in part by a pair of parallel, spaced flat walls 48 and 50 as seen best in FIGS. 4 and 5. This opening communicates with a circular cross-section portion 56 which is slightly larger in diameter than the spacing between 48 and 50 (FIG. 2).

On comparing the FIGS. 2 and 6, it is to be noted that the shaft 22 includes a cylindrical portion 56 between the knob 20 and the reduced diameter portion 46, which cylindrical portion has an outer diameter substantially equal to that of 24. As best seen in FIG. 2, the opening 30 in the base member 28 has a part thereof which is dimensioned to fit closely about 56. Moreover, when the shaft is fully received within the base member opening, the outer end surface of the base member abuts against the knob and the inner end of the cylindrical portion 56 bears against a shoulder, thereby preventing axial movement of the knob and shaft with respect to the base member.

In an alternate form of the invention, the base member 28 and support 44 are of one-piece construction, e.g., one-piece molded plastic.

We claim:

1. A turn-button fastener, comprising in combination:

an oblong knob with an integral shaft extending normally therefrom, said shaft having a first extent immediately adjacent the knob of circular cross-section, a zone of restricted cross-section immediately adjacent said first extent having four flat surfaces arranged at 90° intervals thereabout, the intersecting corners formed of the four flat surfaces on said shaft being radiused, an enlarged collar on the outer end portion of said shaft adjacent to said zone of restricted diameter, and a tapered terminus; and a base member constructed of an elastic material having an opening passing therethrough, the wall defining said opening being resilient and including opposing parallel flat wall surfaces of a spacing substantially equal to the cross-section dimension between opposite shaft flat surfaces, said base member opening walls further having arcuate recesses adjacent said flat surfaces into which the enlarged collar of said shaft is fittingly received and secured against lateral displacement thereby.

* * * * *